July 16, 1968 M. J. COYLE 3,393,368

RIPPLE AND DROOP REDUCTION

Filed Oct. 28, 1964

Michael J. Coyle,
INVENTOR.
BY Harry M. Saragovitz
Edward J. Kelly
Herbert Berl
Jack H. Voigt United States Patent Office 3,393,368
Patented July 16, 1968

3,393,368

RIPPLE AND DROOP REDUCTION

Michael J. Coyle, Bay Shore, N.Y., assignor, by mesne assignments, to the United States of America as represented by the Secretary of the Army Filed Oct. 28, 1964, Ser. No. 407,267
18 Claims. (Cl. 328—64)

ABSTRACT OF THE DISCLOSURE

A control device such as a controlled vacuum tube is effectively connected in series with a microwave klystron and its pulse supply. The tube is controlled by the ripple and droop of the pulse, so as to suppress the ripple and droop applied to the load.

When high-voltage high-power pulses such as ones exciting high-power microwave pulsed transmitters are used, a certain amount of undesirable ripple current and/or voltage and droop is produced. Prior devices have employed the use of diode limiters to reduce the ripple to a tolerable value. When the peak voltage of such microwave transmitters is very high, ordinary diode limiters require the use of an excessive number of elements such as diodes and/or expensive condensers to perform the job. A need, therefore, is present for a circuit which will work effectively to limit ripple and droop on the excitation pulse applied to high-power loads such as klystrons and other equivalent tubes without the need of excessive numbers of diodes and expensive condensers.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention, and in which:

Figure 1:
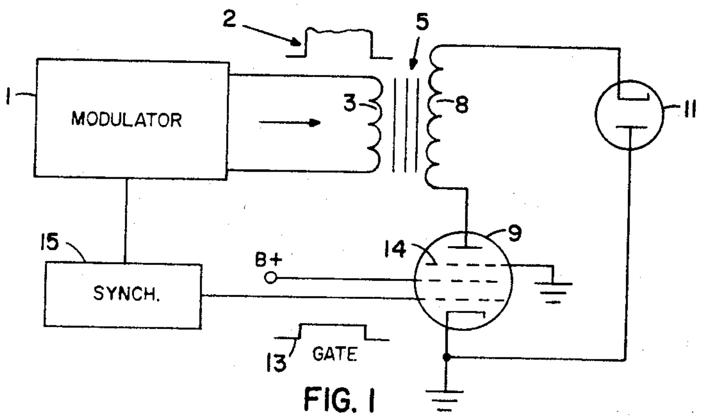
FIGURE 1 shows a schematic diagram illustrating one form of the present invention.

In order to better understand the operation of the system described in the figures, a description of their components referred to is first presented. A modulator 1 of any conventional type pulse modulator is used to supply a pulse 2 to a primary winding 3 of step-up and isolation transformer 5. The pulse 2 has undesired ripples and a droop on it. Secondary winding 8 of transformer 5 is connected across a series combination of a pentode 9 and load 11 in the circuit of FIGURE 1. The load 11 may be a klystron, traveling wave tube, or the like. The tube 9 may be a pentode as shown or may be any conventional controlled tube such as a low power dissipation version of the Litton 3621 tetrode or a transistor. The tube 9 is gated by a gate pulse 13 which may be derived from a synchronous means 15 which is associated to pulse 2 by connection to the modulator 1. A bias voltage B+ may be supplied to one of the grids of tube 9 while another grid 14 is connected ground.

Figure 2:
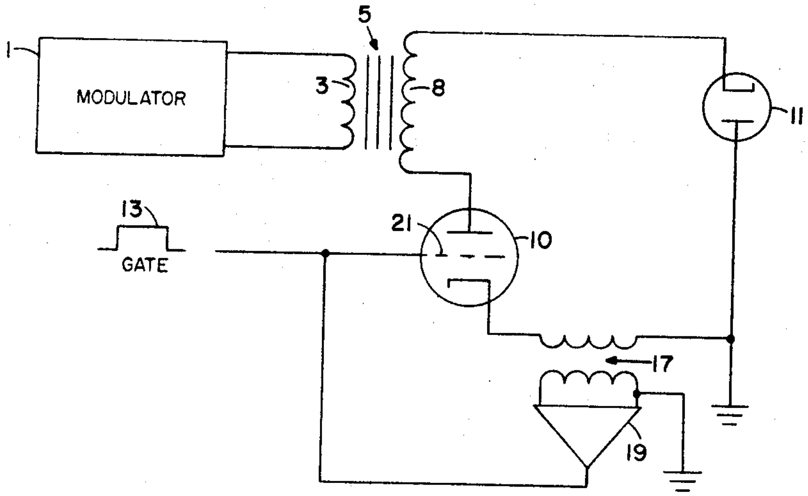
FIGURE 2 is a diagram in schematic form which illustrates a second form of the invention.

In FIGURE 2 a triode 10 is illustrated but may be the same types of tubes useable as tube 9 of FIGURE 1. A suitable current transformer 17 is provided for sensing ripples and the droop in the load current and supplying them to the input of amplifier 19. Amplifier 19 may be of any conventional type. The output of amplifier 19 is connected to a control grid 21 of tube 10. A gate pulse 13 is also supplied to the control grid 21 of the tube 10.

Figure 3:
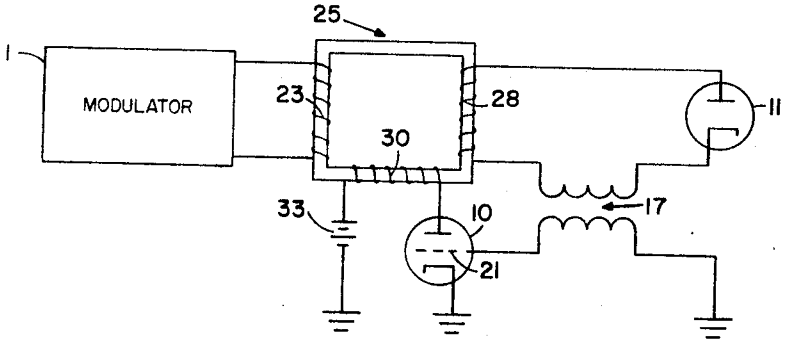
FIGURE 3 is a schematic representation of a third form of the present invention.

FIGURE 3 shows a step-up isolation transformer 25 having primary winding 23, secondary winding 28 and tertiary winding 30. Winding 30 acts as a second primary winding with respect to secondary winding 28. The ripple current in the load is picked up by current transformer 17 and applied to control grid 21 of tube 10. A voltage supply (battery 33) is connected across tube 10 and winding 30 so as to supply current flow through winding 30 of transformer 25.

*Operation*

Modulator 1 of FIGURE 1 produces a high-power high-voltage pulse 2 which is applied through step-up and isolation transformer 2 to the load 11. The pulse 2 has a high ripple and droop component on it and the pulse transformer 5 also has a ripple and droop characteristic. The pentode 9 is gated to conduct by a gating signal 13. The tube 9 will act as a high dynamic impedance and as a low static impedance in series with the output winding 8 of transformer 5 and with the load 11. The ripple voltage will now be developed primarily across tube 9 rather than across load 11.

In FIGURE 2 much of the circuit is the same as the circuit of FIGURE 1. Vacuum tube 10 is now shown as a triode and has the same effect as is achieved by tube 9 in the circuit of FIGURE 1. However, in addition to the gating of the tube a signal proportional to the ripple and droop components of the load current is also applied to the control grid 21. This is done by the use of a suitable current transformer 17 which samples the current ripples and the droop in the load current. These ripples and the droop are amplified by amplifier 19 and then applied to grid 21 to control the triode 10 in phase and amplitude so as to minimize the ripple and droop. Thus the effect of a high dynamic impedance is obtained by the use of a triode.

The operation of FIGURE 3 is similar to the operations of FIGURES 1 and 2, except that the ripple and droop correction is now inserted into the circuit via a third winding 30 in the transformer 25. Sensing of the ripple and droop components is performed by the current transformer 17 which determines the character of the ripple upon the transmitter pulse passing through load 11. Transformer 17 supplies control grid 21 of tube 10 with voltages proportional to the ripple and droop components. Battery 33 in connection with tube 21 causes current to flow in winding 30 of transformer 25 which will tend to produce a voltage across secondary winding 28 which cancels the ripple in the output pulse of modulator 1.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. Accordingly, I desire the scope of my invention to be limited only by the appended claims.

I claim:

1. A ripple and droop reduction system comprising a pulse producing means for generating a high powered pulse which contains a ripple component; a transformer having a primary winding connected to an output of said pulse producing means, and a secondary winding; a load; a control means; said load being connected across the secondary winding of said transformer; and said control means being connected between the load and secondary winding so as to impede flow of ripple and droop current in the load.

2. A ripple and droop reduction system as set forth in claim 1, wherein said control means is gated on by a gating means during the pulse.

3. A ripple and droop reduction system as set forth in claim 2, wherein said control means is a pentode.

4. A ripple and droop reduction system as set forth in claim 1, wherein said control means is a controlled means having input connections and output connections.

5. A ripple and droop reduction system as set forth in claim 4, further comprising a second transformer having a second primary winding connected in series with the load and the control means and having a second secondary winding connected to said input connections of said control means.

6. A ripple and droop reduction system as set forth in claim 5, wherein said second secondary winding is connected to said input connections by way of an amplifier.

7. A ripple and droop reduction system as set forth in claim 6, wherein said control means is a triode, and said load is a klystron.

8. A ripple and droop reduction system as set forth in claim 6, wherein said control means is a controlled vacuum tube device, and said load is a traveling wave tube.

9. A ripple and droop reduction system comprising a pulse producing means for generating a high powered pulse which contains ripple and droop components; a first transformer having a first primary winding, a first secondary winding and a tertiary winding; said primary winding being connected to receive said pulse; a series circuit comprising said secondary winding, a load, and a sensing means; and control means connected between said sensing means and said tertiary winding so as to reduce the amount of ripple applied to the load.

10. A ripple and droop reduction system as set forth in claim 9, wherein said sensing means is a ripple sensing means which detects the ripple and droop in current being fed to said load and applies this to the control means.

11. A ripple and droop reduction system as set forth in claim 10, wherein said sensing means is a second transformer having a second primary winding connected in said series circuit, and having a second secondary winding connected to said control means.

12. A ripple and droop reduction system as set forth in claim 10, wherein said control means comprises a source of voltage supply and a controlled element.

13. A ripple and droop reduction system as set forth in claim 12, wherein said sensing means has an output which is connected across input terminals of said controlled element.

14. A ripple and droop reduction system as set forth in claim 13, wherein said controlled element has output terminals connected in series with said voltage supply means and said tertiary winding.

15. A ripple and droop reduction system as set forth in claim 14, wherein said sensing means is a second transformer having a second primary winding connected in said series circuit, and having a second secondary winding connected across said input terminals of said controlled element.

16. A ripple and droop reduction system as set forth in claim 15, wherein said pulse producing means is a modulator.

17. A ripple and droop reduction system as set forth in claim 16, wherein said load is a traveling wave tube.

18. A ripple and droop reduction system as set forth in claim 16, wherein said load is a klystron.

References Cited

UNITED STATES PATENTS

| | | | |
|---|---|---|---|
| 2,415,302 | 2/1947 | Maxwell | 328—67 |
| 2,782,362 | 2/1957 | Lewis | 328—173 X |
| 2,853,608 | 9/1958 | Smith et al. | 328—67 X |
| 3,021,487 | 2/1962 | Kestenbaum | 328—162 |
| 3,090,010 | 5/1963 | Zavales | 328—67 |
| 3,189,837 | 6/1965 | Grotz et al. | 328—162 |

JOHN S. HEYMAN, *Primary Examiner.*